A. C. FLETCHER.
Improvement in Car-Wheels.

No. 126,280.  Patented April 30, 1872.

Witnesses:
Garvey E. Smith
W. Morris Smith

Inventor:
Addison C. Fletcher

UNITED STATES PATENT OFFICE.

ADDISON C. FLETCHER, OF NEW YORK, N. Y.

IMPROVEMENT IN CAR-WHEELS.

Specification forming part of Letters Patent No. 126,230, dated April 30, 1872.

Specification of an Improved Car-Wheel, invented by ADDISON C. FLETCHER, of the city, county, and State of New York.

This invention relates to the construction of car-wheels, whereby elasticity in every direction is obtained, the risk of flaws from unequal shrinkage and the strain on the bolts necessary to connect the several parts of the wheel are nearly if not entirely avoided; and it consists in a vertically-divided hub-portion, the two halves of which are bolted together, and rotary strain on their connecting-bolts is prevented by intermediate gear-teeth radiating from their axes, the said hub and tread portions of the wheel being connected by spokes radiating inwardly from the tread-portion, and clips radiating outwardly from the hub-portions of the wheel, and which are capped with rubber or other elastic material, and rest in cavities of corresponding form in their reverse positions.

Figure 1:
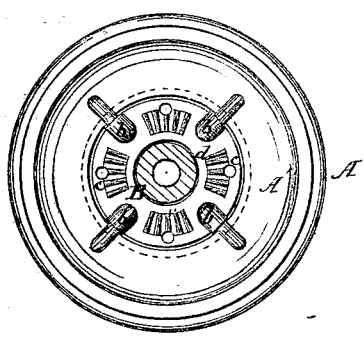
Figure 2:
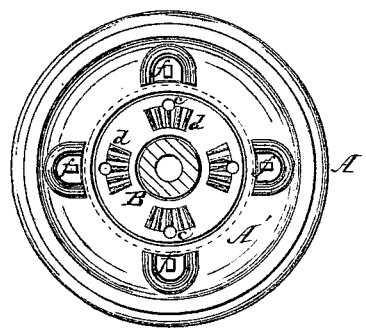

Referring to the drawing, Figure 1 represents a face or outside view of a car-wheel with the outer part of the hub-portion removed. Fig. 2 is a similar view, showing the modification above referred to; and Fig. 3, a face view of the wheel entire, showing the two forms combined.

In these figures, A represents the outer or tread-portion of the wheel, and B the central or hub-portion. This latter is constructed in two parts, divided centrally at right angles to its axis, and each part is formed with a flange, $a$, so that the two, when connected with the tread-portion, span or clasp its disk, and when bolted together form a complete wheel.

As represented in Fig. 1, the hub-portion is constructed with recesses, one-half in each side, so that when connected said recesses form about a hemispherical cavity for the reception of the spokes $b$, which extend in a radial direction inwardly from the disk A' of the tread-portion of the wheel. The spokes $b$, which are of similar shape to the cavities thus formed in the hub, are capped with India rubber or other suitable elastic material, and form a yielding bearing or connection between the hub and the tread portions of the wheel. These two sections B of the hub-portion of the wheel, when in connection with the disk A' of the tread-portion, are bolted together with any suitable manner of bolts $c$, and on their inner faces are formed a series of corrugations, $d$, radiating from the axis of the wheel, which, fitting together, serve to relieve the bolts $c$ from strain in any but a tensile direction.

For light wheels, such as are used on street-cars, instead of the spokes $b$ radiating inwardly from the tread-portion, I substitute clips, $e$, radiating outwardly from the hub-portion, and fitting in recesses formed on the sides of the disk A' of the tread-portion, in which the clips are cushioned with rubbers $f$, or other yielding material, in such form as to afford a similar elastic motion to that of the construction above described.

Figure 3:
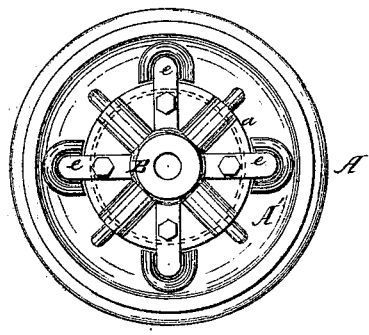

In the construction of a wheel of large diameter, I would apply the two forms of radiating arms or spokes combined, arranged alternately around, at the inner and outer periphery of the tread-portion A and hub-portion B, respectively, as shown in Fig. 3.

From the conformation of these yielding bearings it is obvious that a cushion is formed that will give a certain amount of motion in every direction in which strain can be applied—viz., laterally, vertically, and circumferentially—thus relieving both the wheel and the axle to a very great extent; and which motion and strain or compression of the cushions is divided in proportion to the several angles of the spokes, according to the direction in which the strain is applied.

What I claim, and desire to secure by Letters Patent, is—

1. The disks of the hub-portion B, when provided with corrugations on their inner faces to interlock, substantially as and for the purpose set forth.

2. The radial arms $e$ on each portion of the divided hub B, in combination with recesses on the sides of the disk-portion A of the tread of the wheel, and their elastic cushions $f$, substantially as shown and described.

3. In a wheel constructed substantially as shown and described, the combination of the inwardly-radiating cushioned spokes $b$ of the tread-portion, and the outwardly-radiating cushioned arms of the hub-portion with their respective cavities and recesses, substantially as shown and described.

ADDISON C. FLETCHER.

Witnesses:
SYDNEY E. SMITH,
W. MORRIS SMITH.